United States Patent
Murphy et al.

(10) Patent No.: US 7,638,453 B2
(45) Date of Patent: Dec. 29, 2009

(54) MOLECULAR SIEVE CONTAINING HYDRODEWAXING CATALYSTS

(75) Inventors: William J. Murphy, Baton Rouge, LA (US); Stuart L. Soled, Pittstown, NJ (US); Ian A. Cody, Baton Rouge, LA (US); David W. Larkin, Sugar Land, VA (US); Terry E. Helton, Bethlehem, PA (US); Gary B. McVicker, Califon, NJ (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 71 days.

(21) Appl. No.: 11/205,644

(22) Filed: Aug. 17, 2005

(65) Prior Publication Data

US 2006/0073962 A1    Apr. 6, 2006

Related U.S. Application Data

(60) Provisional application No. 60/607,808, filed on Sep. 8, 2004.

(51) Int. Cl.
*B01J 29/06* (2006.01)
(52) U.S. Cl. .............................. 502/64; 502/65; 502/66; 502/71; 502/73; 502/74; 502/77; 502/214
(58) Field of Classification Search ................... 502/64, 502/65, 66, 71, 73, 74, 77, 214
See application file for complete search history.

(56) References Cited

U.S. PATENT DOCUMENTS

| 4,485,185 | A | 11/1984 | Onodera et al. |
| 5,723,716 | A | 3/1998 | Brandes et al. |
| 6,013,171 | A | 1/2000 | Cook et al. |
| 6,180,828 | B1 * | 1/2001 | Hidaka et al. ............... 564/479 |

FOREIGN PATENT DOCUMENTS

| WO | WO 98/29370 | * | 7/1998 |
| WO | WO 2004/085445 A2 | | 10/2004 |

\* cited by examiner

*Primary Examiner*—Elizabeth D Wood
(74) *Attorney, Agent, or Firm*—Robert A. Migliorini; Gerard J. Hughes

(57) ABSTRACT

A catalyst composition containing a medium pore molecular sieve having deposited thereon an active metal oxide and at least one hydrogenation metal selected from the Group VIII and Group VIB metals for use in hydrodewaxing lube oil boiling range feedstreams.

12 Claims, 4 Drawing Sheets

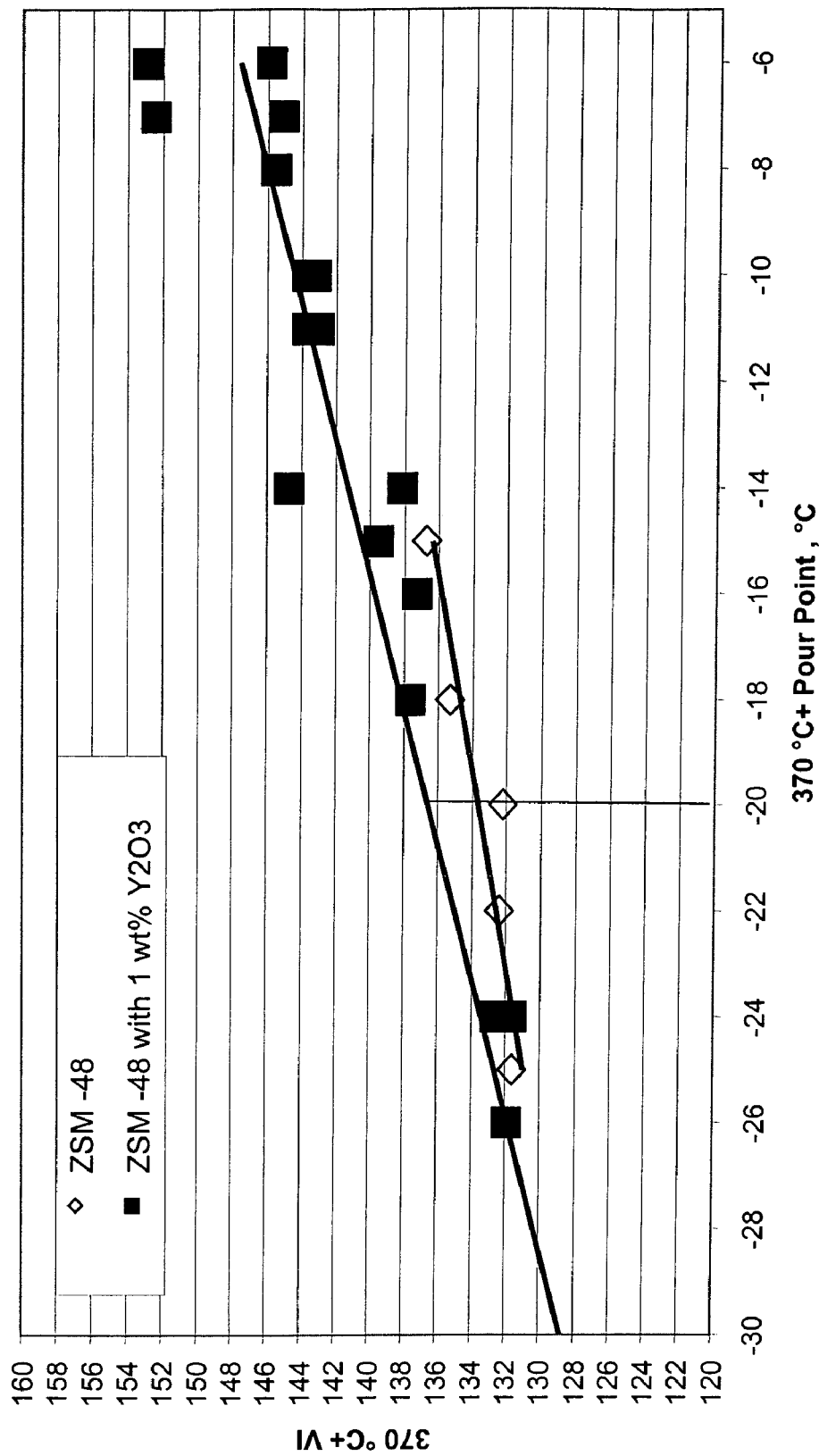

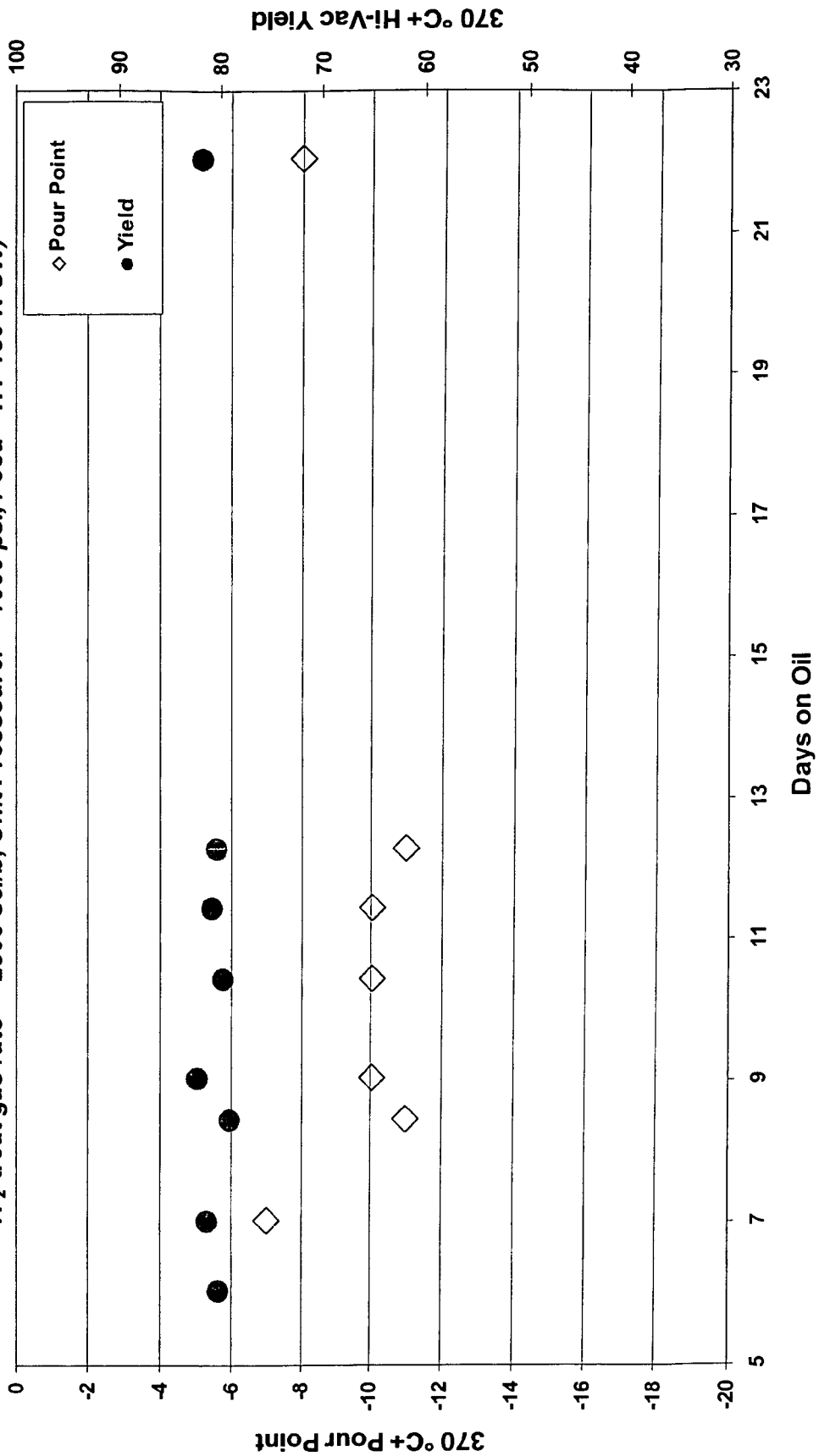

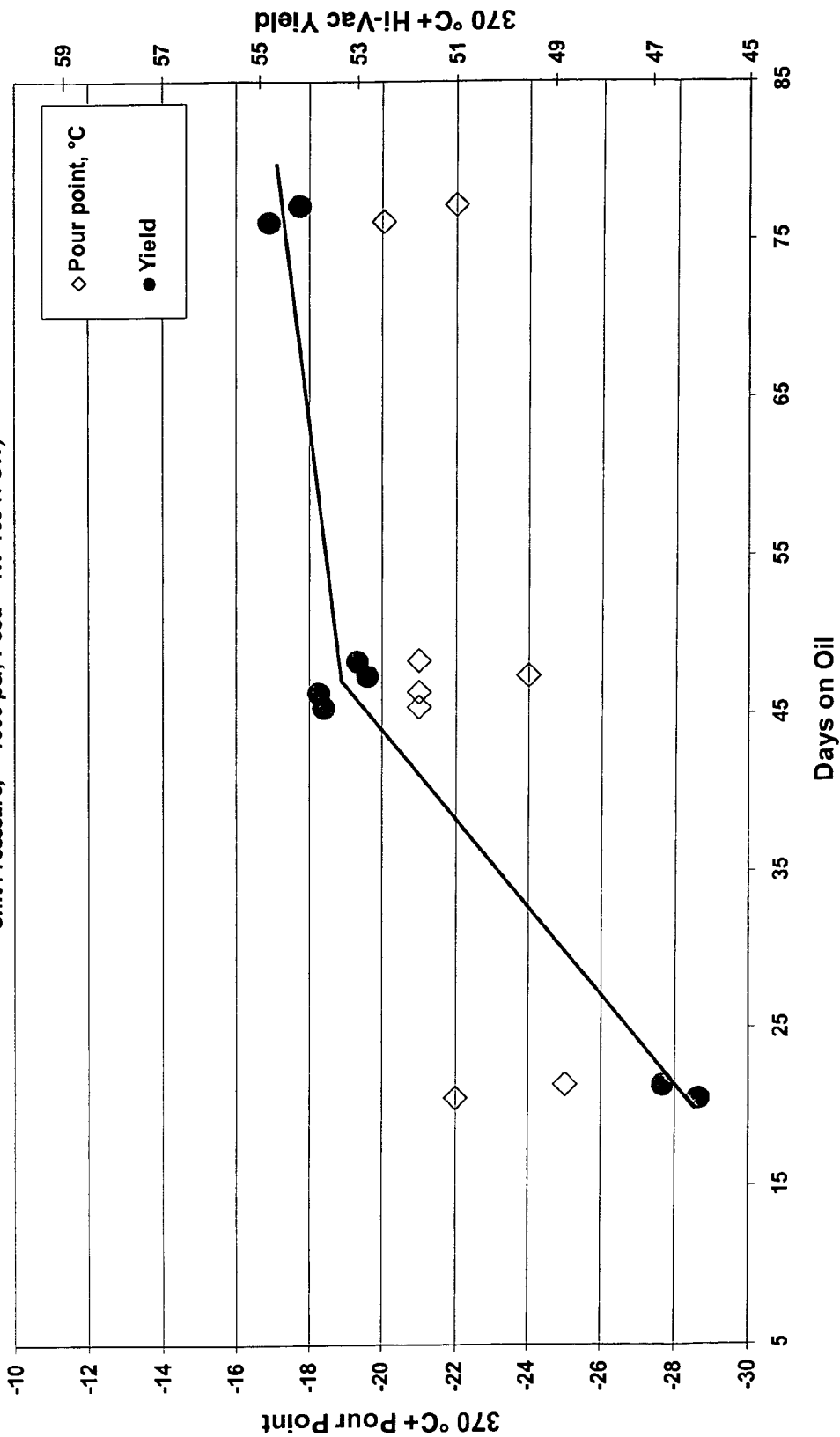

MOLECULAR SIEVE CONTAINING HYDRODEWAXING CATALYSTS

CROSS REFERENCE TO RELATED APPLICATION

This application claims benefit of U.S. Provisional Patent Application Ser. No. 60/607,808 filed Sep. 8, 2004.

FIELD OF THE INVENTION

The present invention relates to a catalyst suitable for use in dewaxing lube oil boiling range feedstreams. More particularly, the present invention is directed at a catalyst composition containing a medium pore molecular sieve having deposited thereon an active metal oxide and at least one hydrogenation metal selected from the Group VIII and Group VIB metals.

BACKGROUND OF THE INVENTION

Further, most lubricating oil feedstocks must be dewaxed in order to produce lubricating oils which will remain fluid down to the lowest temperature of use. Dewaxing is the process of separating or converting hydrocarbons which solidify readily (i.e., waxes) in petroleum fractions. The hydrodewaxing of wax and waxy feeds boiling in the lubricating oil range and catalysts useful in such processes is well known in the art. Generally these processes utilize catalysts comprising a molecular sieve component and a component selected from the Group VIII and/or Group VIB metals.

As finished oil performance requirements increase so does the requirement for improved lube oil basestocks properties. To address this need the search for new and different processes, catalysts and catalyst systems that exhibit improved activity, selectivity and/or longevity is an ongoing exercise. Thus, there currently is a need in the art for an improved dewaxing catalyst and method of making the dewaxing catalyst.

BRIEF DESCRIPTION OF THE FIGURES

FIG. 2 is a graph comparing the pour point to viscosity index of lube oil products obtained by hydrodewaxing a 150N slack wax with a ZSM-48 catalyst according to the present invention compared to a conventional ZSM-48 based hydrodewaxing catalyst.

FIG. 3 is a graph relating yield to time on stream at constant pour point of for a catalyst according to the present invention.

FIG. 4 is a graph relating yield to time on stream at constant pour point fir a conventional ZSM-48 hydrodewaxing catalyst.

SUMMARY OF THE INVENTION

Figure 1:
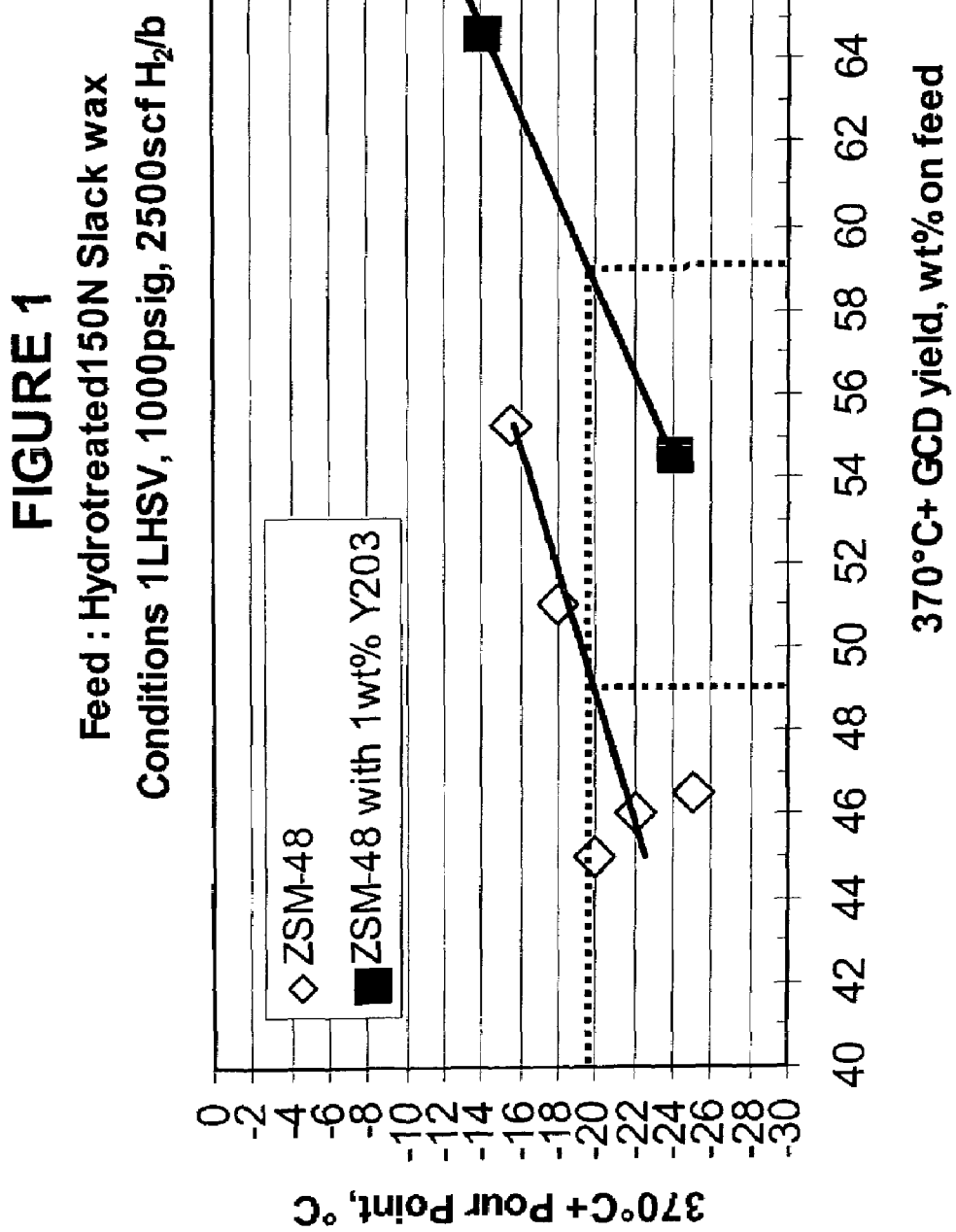
FIG. 1 is a graph relating pour point to yield of lube oil basestocks obtained by hydrodewaxing a 150N slack wax with a ZSM-48 catalyst according to the present invention compared a conventional ZSM-48 based hydrodewaxing catalyst.

The present invention is directed at a catalyst suitable for use in upgrading feedstreams boiling in the lube oil range. The catalyst comprises:
  a) at least one medium pore molecular sieve;
  b) at least one active metal oxide selected from the rare earth metal oxides; and
  c) at least one hydrogenation metal selected from the Group VIII and Group VIB metals.

In one embodiment of the instant invention, the at least one active metal oxide of the hydrodewaxing catalyst is selected from the Group IIIB rare earth metal oxides.

In yet another embodiment, the rare earth metal oxide is yttria.

In still another embodiment, the at least one hydrogenation metal selected from the Group VIII and Group VIB metals of the hydrodewaxing catalyst is selected from the Group VIII noble metals.

In still another embodiment, the at least one hydrogenation metal selected from the Group VIII and Group VIB metals of the hydrodewaxing catalyst is selected from Pt, Pd, and mixtures thereof.

In still another embodiment, the at least one Group VIII metal is selected from Pt, Pd, and mixtures thereof.

DETAILED DESCRIPTION OF THE INVENTION

The present invention is a catalyst suitable for use in the upgrading of hydrocarbon feedstreams boiling in the lubricating oil range. The hydrodewaxing catalyst comprises at least one medium pore molecular sieve, at least one active metal oxide selected from the rare earth metal oxides, and at least one Group VIII metal.

As stated above, the catalysts according to the present invention comprise at least one medium pore molecular sieve. Medium pore molecular sieves suitable for use in the present invention can be selected from acidic metallosilicates, such as silicoaluminophophates (SAPOs), and unidimensional 10 ring zeolites, i.e. medium pore zeolites having unidimensional channels comprising 10 member rings. It is preferred that the molecular sieve be a zeolite.

The silicoaluminophosphates (SAPOs) useful as the at least one molecular sieve can be any of the SAPOs known. Preferred SAPOs include SAPO-11, SAPO-34, and SAPO-41.

The medium pore zeolites, sometimes referred to as unidimensional 10 ring zeolites, suitable for use in the dewaxing catalyst employed herein can be any of those known. Medium pore zeolites as used herein can be any zeolite described as a medium pore zeolite in *Atlas of Zeolite Structure Types,* W. M. Maier and D. H. Olson, Butterworths. Zeolites are porous crystalline materials and medium pore zeolites are generally defined as those having a pore size of about 5 to about 7 Angstroms, such that the zeolite freely sorbs molecules such as n-hexane, 3-methylpentane, benzene and p-xylene. Another common classification used for medium pore zeolites involves the Constraint Index test which is described in U.S. Pat. No. 4,016,218, which is hereby incorporated by reference. Medium pore zeolites typically have a Constraint Index of about 1 to about 12, based on the zeolite alone without modifiers and prior to treatment to adjust the diffusivity of the catalyst. Preferred unidimensional 10-ring zeolites are ZSM-22, ZSM-23, ZSM-35, ZSM-57, ZSM-48, and ferrierite. More preferred are ZSM-22, ZSM-23, ZSM-35, ZSM-48, and ZSM-57. The most preferred is ZSM-48. The most preferred synthesis route to ZSM-48 is that described in U.S. Pat. No. 5,075,269.

The medium pore molecular sieves used in the present invention are preferably combined with a suitable porous binder or matrix material. Non-limiting examples of such materials include active and inactive materials such as clays, silica, and/or metal oxides such as alumina. Non-limiting examples of naturally occurring clays that can be composited include clays from the montmorillonite and kaolin families including the subbentonites, and the kaolins commonly known as Dixie, McNamee, Georgia, and Florida clays. Others in which the main mineral constituent is halloysite, kaolinite, dickite, nacrite, or anauxite may also be used. The clays can be used in the raw state as originally mixed or subjected to calcination, acid treatment, or chemical modification prior to being combined with the at least one molecular sieve. It is preferred that the porous matrix or binder material comprises at least one of silica, alumina, or a kaolin clay. It is more preferred that the binder material comprise alumina. The amount of molecular sieve in the at least one molecular sieve is from 10 to 100 wt. %, preferably 35 to 100 wt. %, based on the composited molecular sieve. Such molecular sieves can be formed by methods such spray drying, extrusion and the like. Catalysts according to the present invention may be used in the sulfided or unsulfided form, and is preferably in the sulfided form.

Hydrodewaxing catalysts according to the present invention also comprise at least one active metal oxide selected from the rare earth metal oxides. As used herein, "rare earth metal oxides" is meant to refer to those metal oxides comprising those elements of the periodic table having atomic numbers between 57 and 71 and yttrium, which has an atomic number of 39 but behaves similar to the rare earth metals in many applications. It is preferred that the at least one active metal oxide be selected from those rare earth metal oxides of Group IIIB of the periodic table including yttrium, more preferably the at least one active metal oxide is yttria.

The at least one active metal oxide can be incorporated onto the above-described medium pore molecular sieve by any means known to be effective at doing so. Non-limiting examples of suitable incorporation means include incipient wetness, ion exchange, mechanical mixing of metal oxide precursor(s) with molecular sieve and binder, or a combination thereof, with the incipient wetness technique being the preferred method.

The amount of active metal oxide incorporated, i.e. deposited, onto the medium pore molecular sieve is greater than 0.1 wt. %, based on the catalyst. Preferably the amount of mixed metal oxide ranges from about 0.1 wt. % to about 10 wt. %, more preferably from about 0.5 .wt. % to about 8 .wt. %, most preferably from about 1 wt. % to about 4 wt. %.

Hydrodewaxing catalysts according to the present invention also include at least one hydrogenation metal selected from the Group VIII and Group VIB metals. Thus, hydrodewaxing catalysts suitable for use in the present invention are bifunctional. The at least one hydrogenation metal selected from the Group VIII and Group VIB metals functions as a metal hydrogenation component. Preferred Group VIII metals are those selected from the Group VIII noble metals, more preferably selected from Pt, Pd and mixtures thereof with Pt representing the most preferred Group VIII metal. Preferred Group VIB metals include Molybdenum and Tungsten. In a particularly preferred embodiment, the at least one hydrogenation metal is selected from the Group VIII metals with preferred, etc. Group VIII metals being those described above.

The at least one hydrogenation metal can be incorporated, i.e. deposited, onto the medium pore molecular sieve before or after, preferably after, the at least one active metal oxide has been deposited thereon. The at least one hydrogenation metal can also be incorporated onto the above-described active metal oxide-containing medium pore molecular sieve by any means known to be effective at doing so. Non-limiting examples of suitable incorporation means include incipient wetness, ion exchange, mechanical mixing of metal oxide precursor(s) with molecular sieve and binder, or a combination thereof, with the incipient wetness technique being the preferred method.

The amount of the at least one hydrogenation metal incorporated, i.e. deposited, onto the metal oxide-containing medium pore molecular sieve is between about 0.1 to about 30 wt. %, based on catalyst. Preferably the amount of the at least one hydrogenation metal ranges from about 0.2 wt. % to about 25 wt. %, more preferably from about 0.5 wt. % to about 20 wt. %, most preferably from about 0.6 to about 20 wt. %.

The catalysts of the present invention are suited for use in upgrading hydrocarbon feedstreams boiling in the lube oil range. They are especially suited for use in catalytically hydrodewaxing lube oil boiling range feedstreams. The inventors hereof have found that catalytic hydrodewaxing processes employing the present invention provide the processes with improved yields and lube oil boiling range products having better viscosity indexes ("VI") when compared to processes utilizing currently available commercial hydrodewaxing catalysts. The increase in yields, sometimes referred to as yield credits, are on the order of 10%, based on the feed, and the VI increase, sometimes referred to as VI credits, are on the order of about 1-5 VI points.

When used in lubricating oil-upgrading processes, the instant invention can be used to upgrade a variety of lube oil boiling range feedstreams. These feedstreams are typically wax-containing feeds that boil in the lubricating oil range, typically having a 10% distillation point greater than 650° F. (343° C.), measured by ASTM D 86 or ASTM 2887, and are derived from mineral sources, synthetic sources, or a mixture of the two. Non-limiting examples of suitable lubricating oil feedstreams include those derived from sources such as oils derived from solvent refining processes such as raffinates, partially solvent dewaxed oils, deasphalted oils, distillates, vacuum gas oils, coker gas oils, slack waxes, foots oils and the like, dewaxed oils, automatic transmission fluid feedstocks, and Fischer-Tropsch waxes. Preferred lubricating oil feedstreams are those selected from raffinates and dewaxed oils.

These feedstreams may also have high contents of nitrogen- and sulfur-contaminants. Feeds containing up to 0.2 wt. % of nitrogen, based on feed and up to 3.0 wt. % of sulfur can be processed utilizing the present invention. Feeds having a high wax content typically have high viscosity indexes of up to 200 or more. Sulfur and nitrogen contents may be measured by standard ASTM methods D5453 and D4629, respectively.

The conditions employed by the lube oil boiling range upgrading processes utilizing the instant invention can be any conditions suitable for use in that process. For example, if the present invention was utilized in a catalytic hydrodewaxing process effective catalytic hydrodewaxing conditions as generally include temperatures of from 250° C. to 400° C., preferably 275° C. to 350° C., pressures of from 791 to 20786 kPa (100 to 3000 psig), preferably 1480 to 17339 kPa (200 to 2500 psig), liquid hourly space velocities of from 0.1 to 10 $hr^{-1}$, preferably 0.1 to 5 $hr^{-1}$ and hydrogen treat gas rates from 45 to 1780 $m^3/m^3$ (250 to 10000 scf/B), preferably 89 to 890 $m^3/m^3$ (500 to 5000 scf/B).

The above description is directed to preferred embodiments of the present invention. Those skilled in the art will recognize that other embodiments that are equally effective could be devised for carrying out the spirit of this invention.

The following examples will illustrate the improved effectiveness of the present invention, but is not meant to limit the present invention in any fashion.

EXAMPLES

Example 1

Catalyst Preparation

Comparative Catalyst—Catalyst A

A base case catalyst for comparison was prepared by extruding 65 parts of ZSM-48 crystal (Si/Al2~200/1) with 35 parts of pseudoboehmite alumina. After extrusion, the extrudate was dried at 121° C. in air, followed by calcination in nitrogen at 538° C. to decompose the organic template in the zeolite. After decomposition, the extrudate was exchanged with 1 N NH4NO3 nitrate to remove sodium, followed by an additional drying step at 121° C. After the second drying step, the catalyst was calcined in air at 538° C. to convert the NH4-form of the ZSM-48 to the H-form and to remove any residual carbon remaining on the catalyst after nitrogen decomposition. The H-form of the extrudate was then impregnated with 0.6 wt. % Pt by incipient wetness impregnation using platinum tetraammine nitrate and water. After impregnation, the catalyst is dried again at 121° C. to remove excess water, followed by a mild air calcination at 360° C. to decompose the metal salt to platinum oxide.

A Catalyst According to the Present Invention—Catalyst B

A 1 wt. % yttrium containing ZSM-48 catalyst was prepared in similar fashion to the base case catalyst described above, but prior to the platinum tetraammine nitrate impregnation, the H-form of the extrudate was impregnated with yttrium nitrate (1 wt. % yttrium) using the incipient wetness technique. The yttrium containing catalyst was then calcined in flowing air at 538° C. to decompose the yttrium nitrate to yttrium oxide. After calcination, the yttrium containing ZSM-48 extrudate was impregnated with 0.6 wt. % Pt by incipient wetness impregnation using platinum tetraammine nitrate and water. After Pt impregnation, the resulting catalyst was dried again at 121° C. to remove excess water, followed by mild air calcination at 360° C. to decompose the metal salt to platinum oxide.

Example 2

Catalyst Use

Catalyst A and B, described in Example 1 above, were separately used to dewax a previously hydrotreated 150N slack wax having about 5 wppm sulfur, about 4 wppm nitrogen, and having a mean average boiling point of 420° C., as determined by gas chromatography. Both Catalyst A and Catalyst B were used under identical process conditions described below.

Catalyst A and B were used in two separate experiments each employing the same dewaxing conditions including temperatures of about 325° C., pressures of 1000 psig (6996 kPa), liquid hourly space velocities of 1 hr$^{-1}$, and hydrogen treat gas rates of 2500 scf/bbl (445 m$^3$/m$^3$). The dewaxing of the 150N slack wax feed was carried out in a simple vertical tubular reactor, which allowed co-feeding of the hydrocarbon feeds and hydrogen. The results of these experiments are illustrated in FIGS. 1, 2, 3, and 4.

FIG. 1 illustrates that a catalyst according to the present invention, Catalyst B, shows an unexpected improvement over a conventional hydrodewaxing catalyst, Catalyst A. As illustrated in FIG. 1, one of the unexpected improvements of the present invention is that, at constant pour point of −20° C., under identical hydrodewaxing conditions, a hydrodewaxing process employing Catalyst A produces a 49 wt. % yield, based on the feed, while a hydrodewaxing process utilizing Catalyst B, a catalyst according to the present invention, produces a yield of 59 wt. %, based on the feed.

FIG. 2 illustrates a further unexpected improvement of the current invention. FIG. 2 illustrates that a hydrodewaxing process employing the present invention produced a product having a Viscosity Index ("VI") 2 to 5 VI points higher than the product produced by a hydrodewaxing process utilizing Catalyst A.

FIGS. 3 and 4, when compared, illustrate another unexpected improvement of the present invention. FIG. 3 illustrates that a process utilizing a catalyst according to the present invention, a catalyst such as Catalyst B, lines out after less than 5 days, and exhibits yields (as defined as 370° C.+ Hi-Vac yields) of 82% over a period from 5 to 23 days on oil at constant pour point. FIG. 4, however, illustrates that a hydrodewaxing process using the same hydrodewaxing conditions but utilizing Catalyst A, takes much longer to line out. As illustrated in FIG. 4, the hydrodewaxing process employing Catalyst A, even after 75+ days on oil has not reached a steady state. Further this process has not attained the high 370° C.+ Hi-Vac yields of the hydrodewaxing process employing Catalyst B. Thus, FIGS. 1, 2, 3, and 4 illustrate that the present invention provides a lube oil upgrading catalyst having an unexpectedly rapid line out time, and higher yields of a product having a better VI than a process employing a conventional ZSM-48 based hydrodewaxing catalyst.

The invention claimed is:

1. A catalyst suitable for upgrading lube oil boiling range feedstreams, wherein said catalyst consists of:
    a) at least one medium pore molecular sieve, said medium pore molecular sieve being ZSM-48;
    b) at least one metal oxide selected from yttria or the rare earth metal oxides; and
    c) at least one hydrogenation metal selected from the Group VIII and Group VIB metals,
    wherein said medium pore molecular sieve is composited with a suitable porous binder or matrix material selected from alumina, silica, titania, or zirconia.

2. The catalyst according to claim 1 wherein said suitable porous binder or matrix material is alumina.

3. The catalyst according to claim 1 wherein said at least one metal oxide is yttria.

4. The catalyst according to claim 1 wherein said at least one metal oxide and said at least one hydrogenation metal are deposited onto the medium pore molecular sieve by a method selected from incipient wetness, ion exchange, mechanical mixing of metal oxide precursor(s) with the medium pore molecular sieve and binder, and any combination thereof.

5. The catalyst according to claim 4 wherein said at least one metal oxide is deposited onto the medium pore molecular sieve in an amount greater than 0.1 wt. %, based on the catalyst.

6. The catalyst according to claim 5 wherein said at least one metal oxide is deposited onto the medium pore molecular sieve in an amount ranging from about 0.1 to about 10 wt. %.

7. The catalyst according to claim 1 wherein said at least one hydrogenation metal is selected from the Group VIII metals.

8. The catalyst according to claim 7 wherein said at least one hydrogenation metal is selected from the Group VIII noble metals.

9. The catalyst according to claim 7 wherein said at least one hydrogenation metal is selected from Pt, Pd and mixtures thereof.

10. The catalyst according to claim 9 wherein said at least one hydrogenation metal is Pt.

11. The catalyst according to claim 1 wherein said at least one hydrogenation metal is deposited onto the medium pore molecular sieve in and amount ranging from between about 0.1 to about 30 wt. %, based on catalyst.

12. The catalyst according to claim 1 wherein said at least one hydrogenation metal is deposited onto said medium pore molecular sieve after said at least one active metal oxide is deposited thereon.

* * * * *